March 24, 1959     E. W. THRASHER     2,878,947
LUMBER STACKER
Filed June 13, 1955     3 Sheets-Sheet 1
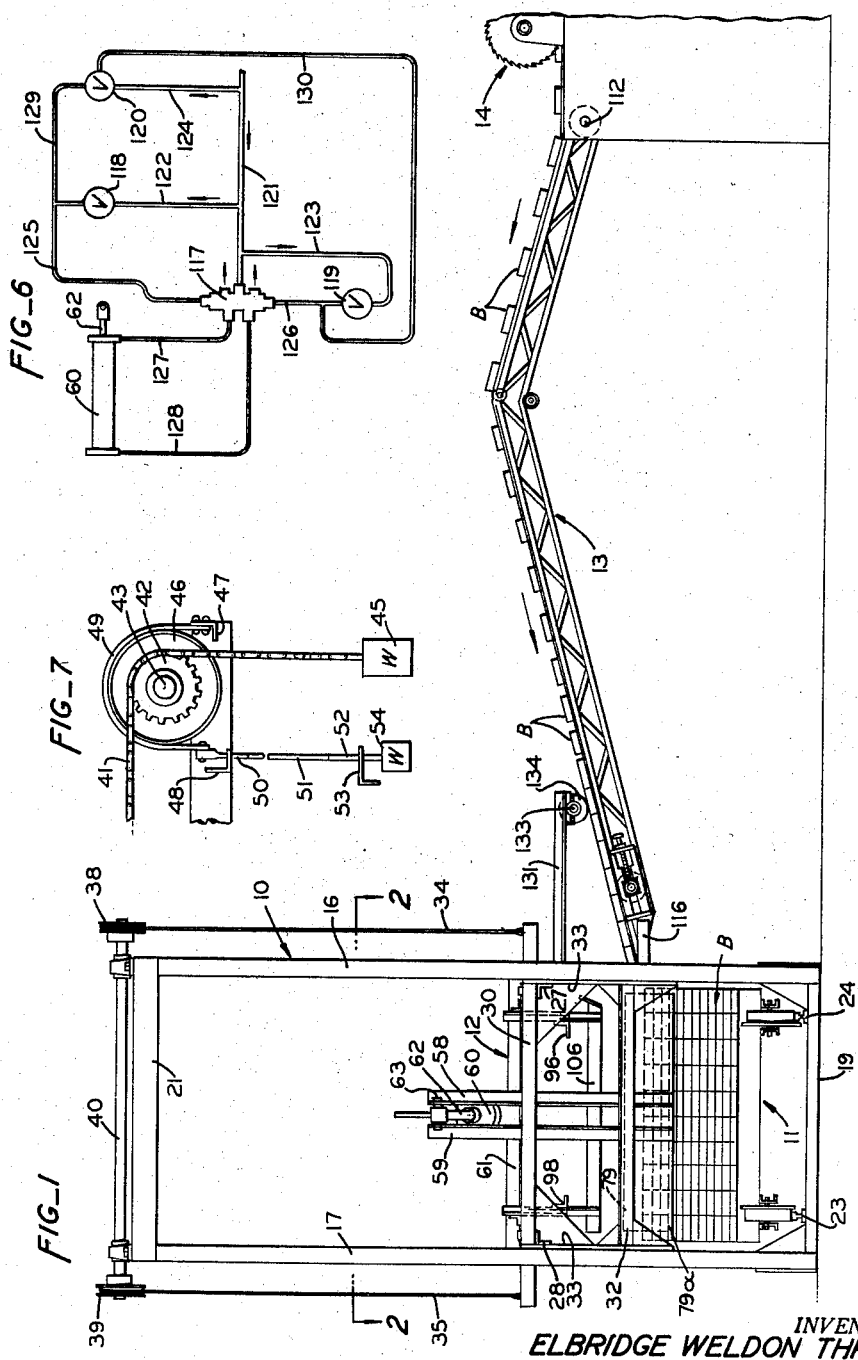
INVENTOR.
ELBRIDGE WELDON THRASHER
BY
ATTORNEYS

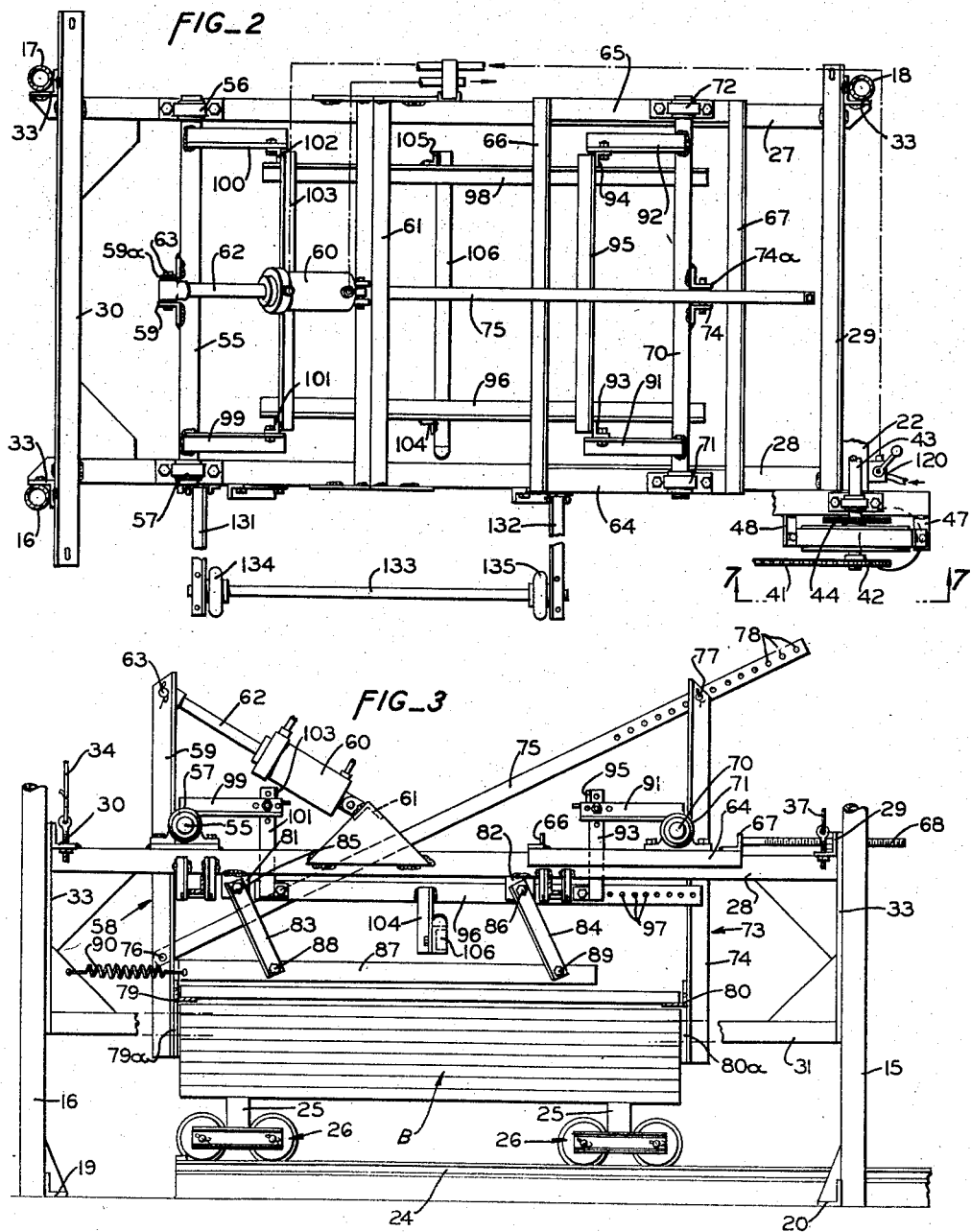

March 24, 1959  E. W. THRASHER  2,878,947
LUMBER STACKER
Filed June 13, 1955  3 Sheets-Sheet 3
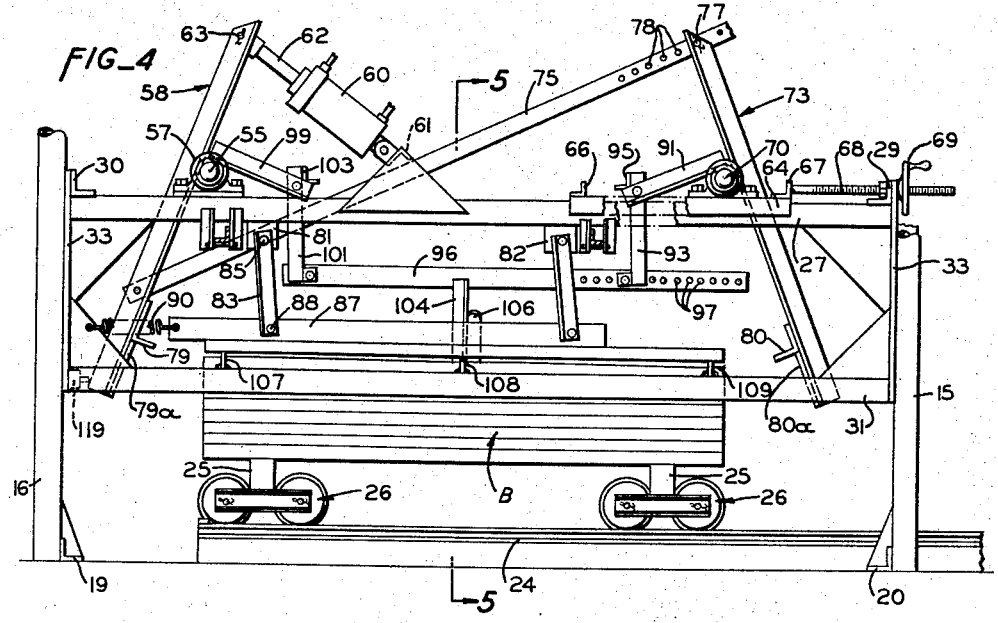
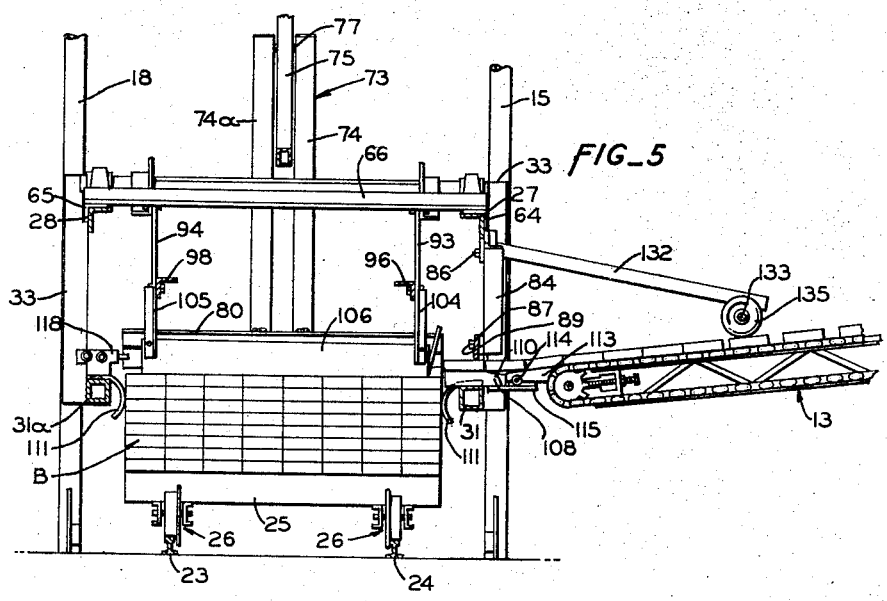
INVENTOR.
ELBRIDGE WELDON THRASHER
BY
ATTORNEYS Patented Mar. 24, 1959

2,878,947

LUMBER STACKER

Elbridge Weldon Thrasher, Arcata, Calif.

Application June 13, 1955, Serial No. 514,912

8 Claims. (Cl. 214—6)

This invention relates to a device for stacking lumber. More particularly, the invention relates to a device for receiving boards of uniform width, thickness, and length as they leave a trimming saw and automatically stacking the boards on a lumber transporting device in an even rectangular stack.

It is the principal object of this invention to provide a lumber stacker including: a main rectangular frame adapted to straddle a lumber transport device; an elevator mechanism mounted for vertical movement within the main frame; and a pair of arms pivotally mounted to the elevator mechanism in opposing tong-like relation. Each of the arms is provided with a lumber receiving ledge and the lumber is fed thereon by a conveyor, board by board, until a tier of boards one board in depth is formed on said ledges with the ledges supporting the board ends. When the tier is complete, the arms are actuated outwardly to permit the tier of boards to drop onto the lumber transport device immediately therebelow. The elevator is then moved upwardly a distance equal to one board thickness and the arms move toward each other to receive the boards forming the next tier.

A further object of the invention is to provide a stacking mechanism according to the previous object wherein the delivery end of the conveyor is articulated to the elevator mechanism adjacent the lumber receiving ledges on the arms.

Another object of the invention is to provide a lumber stacker according to the previous objects wherein four downwardly and inwardly inclined cam surfaces are provided, one adjacent each of the four corners of the elevator mechanism immediately below the ledges on the arms to square each tier of boards relative to said elevator mechanism as said tier is dropped from the arm ledges.

A preferred form of the invention is described in the following detailed specification, and illustrated by way of example in the accompanying drawings, wherein:

Fig. 1 is a side elevation of a stacker constructed according to the principles of the invention.

Fig. 2 is a sectional view taken on line 2—2 of Fig. 1.

Fig. 3 is a front elevation of the stacker showing the tier forming arms in their inner position.

Fig. 4 is a similar view to that shown in Fig. 3 and shows the arms moved outwardly to tier dropping position.

Fig. 5 is a sectional view taken on line 5—5 of Fig. 4.

Fig. 6 is a schematic view of the pneumatic system.

Fig. 7 is a fragmentary view taken generally on line 7—7 of Fig. 2 and illustrating the brake and counterweight assembly.

Referring now to the drawings wherein similar reference numerals are used to denote the same elements throughout the various views shown, 10 generally indicates a rectangular frame adapted to straddle a lumber transport device 11. An elevator mechanism indicated generally at 12 is mounted in the frame 10 for vertical movement therewithin. An endless conveyor 13 is connected with its receiving end, pivotally attached to the table of an end trimming saw 14 and its delivery end connected to the elevator 12.

For purposes of description, the side of the device connected to the conveyor will be hereinafter referred to as the front of the device. The other sides will be termed the right, left, and rear sides from the point of view of a person standing in the rear of the device and looking toward the front.

The main frame 10 comprises four vertical posts 15, 16, 17, and 18, one at each of its corners. A cross brace 19 connects the lower ends of posts 16 and 17 at the right side of the frame and a similar cross brace 20 connects the lower ends of posts 15 and 18 at the left side. The upper ends of posts 16 and 17 are connected by a cross brace 21 and the upper ends of posts 15 and 18 are connected by a similar brace 22, a fragment of which is shown in Fig. 2. Similar cross braces (not shown) connect the upper ends of posts 15 and 16 and posts 17 and 18.

The main frame straddles a pair of rails 23 and 24 which extend laterally under the device from the left side as seen in Figs. 1 and 3. A lumber transport 11 is mounted on the rails for movement into and out from under the frame 10. The lumber transport 11 comprises two dollies each having a cross beam 25 with a pair of railroad wheels 26 mounted at each of its ends. Each of the dollies is independent of the other and the two dollies are maintained one under each end of the lumber stack built up thereon by frictional contact between the lowermost tier of boards and the cross beams 25. It should be understood that the dollies described herein are illustrative only of one means of moving the stacked lumber out from under the frame 10 and that other devices such as skids or wheeled vehicles not on tracks could be employed.

*Elevator mechanism*

The elevator mechanism comprises a pair of upper front and rear parallel members 27 and 28 connected to each other adjacent their ends by a pair of side members 29 and 30 to form an upper rectangular elevator frame. A second lower rectangular elevator frame is made up of two front and rear box-shaped members 31 and 31a and two sides members, one of which is shown at 32 in Fig. 1. The upper and lower rectangular elevator frames are identical in size.

As can best be seen in Fig. 2, the ends of each of the elevator frame members 27 through 32 extend beyond their point of connection with the other elevator frame members to which it is connected to form a right angle projection embracing one of the corner posts 15 to 18. A vertically extending angle plate 33 is connected to each of the upper and lower frames of each of the corners thereof within the projecting angle described above. The plates 33 each slidably engages one of the corner posts 15 to 18 to guide the elevator mechanism for vertical movement within the main frame 10. Triangular braces are fitted into each of the corners of the elevator mechanism framework in the manner shown in the drawings to provide a rigid box-like structure.

A counterbalancing mechanism for the elevator mechanism comprises four cables 34, 35, 36, and 37, one connected to each of the four corners of the elevator frame and extending upwardly therefrom. The cables 34 and 35 are connected to the opposite ends of the elevator frame member 30 and are trained over pulleys 38 and 39 fixed to a shaft 40 journaled adjacent the upper right edge of the main frame 10. The other end of cable 34 is attached to a chain 41 shown in Figs. 2 and 7. The chain 41 is trained over a sprocket wheel 42 fixed to a rotatable shaft 43 journaled adjacent the upper left edge of the main frame 10. A chain (not shown) is similarly connected to the other end of the cable 35 and is trained over another sprocket (not shown) fixed to the rear end of the shaft 43. One end of the cable 37 is attached to the front end of the elevator frame member 29. The other end is fixed to one end of a chain trained over a third sprocket 44 fixed to the shaft 43. One end of the cable 36 is attached to the rear of the elevator frame member 29 and the other end to a chain (not shown) trained over a fourth sprocket (not shown) fixed to the shaft 43. The free ends of the chain 41 and the chain connected to cable 37 and trained over sprocket 44 are each connected to a counterweight 45 as shown in Fig. 7. Similarly the free ends of the chains connected to the cables 35 and 36 are connected to a similar counterweight (not shown) adjacent the left rear corner of the device. Since the chains associated with each of the four corners of the elevator frame all are trained over sprocket wheels fixed to a common shaft, it is obvious that the cables must each move upwardly and downwardly in unison and thereby eliminate any cramping or misalignment of the elevator mechanism 12 relative to the main frame 10.

In order to prevent the free movement of the elevator mechanism 12 within the frame 10 and to insure that the elevator mechanism 12 will stay in any adjusted position relative to the frame 10, a friction brake is provided to retard movement of the shaft 43. As best seen in Fig. 7, the friction brake comprises a brake wheel 46 fixed to the shaft 43 for rotation therewith. Two brake bank guide members 47 and 48 are fixed to the frame 10 and extend outwardly therefrom, one adjacent each side of the brake wheel 46 in the manner shown in Figs. 2 and 7. A brake band 49 having one of its ends fixed to the guide member 47 extends over the top of the brake wheel 46 in frictional engagement therewith. The opposite end of the brake band 49 is connected to a rod 50 extending loosely through a suitable opening in the guide member 48. The other end of the rod 50 is connected to a cable or strap 51 extending downwardly toward the bottom of the frame 10. The lower end of the cable or strap 51 is connected to a rod 52 extending through a suitable aperture in a member 53 fixed to the lower end of the frame 10. A weight 54 is fixed to the lower end of the rod 52 whereby tension is automatically applied to the brake band 49.

Turning now to the operating members mounted on the elevator frame 12, a shaft 55 extends forwardly and rearwardly of the assembly and is mounted for rotation in the journals 56 and 57 fixed to the upper frame members 27 and 28 respectively, adjacent one end thereof. An arm 58, comprising two channel members 59 and 59a fixed to the shaft 55, extends both upwardly and downwardly therefrom adjacent the mid-portion thereof. A pneumatic cylinder 60 is pivotally mounted at one of its ends to a cross brace 61 fixed between the elevator frame members 27 and 28. A piston 62 extends outwardly from said cylinder and is pivotally connected to the upper end of the arm 58 by a pin 63.

A movable carriage comprising members 64, 65, 66, and 67 connected together in the form of a rectangle, is slidably mounted on the upper elevator frame members 27 and 28 for movement toward and away from the shaft 55. A threaded rod 68 is fixed to the member 67 centrally thereof and extends toward the left therefrom. The rod 68 is threadedly received with a handwheel 69 rotatably mounted on the upper elevator frame member 29, whereby the position of the carriage relative to the elevator frame may be adjusted by rotating the handwheel 69.

A shaft 70 is rotatably mounted parallel to the shaft 55 in suitable journals 71 and 72 fixed to the carriage members 64 and 65, respectively. A second arm 73 comprising members 74 and 74a is fixed to the shaft 70 centrally thereof and extends upwardly and downwardly therefrom. A connecting link 75 is pivotally connected at one of its ends to the arm 58 adjacent the lower end thereof as indicated at 76. The opposite end of the link 75 is pivotally connected to the upper end of the arm 73 by a pin 77 extending through suitable apertures in the arm members 74 and 74a and through any one of a plurality of apertures 78 spaced longitudinally along the link 75. The distance from the shaft 55 to the pivot 76 is exactly equal to the distance from the shaft 70 to the pivot 77 whereby the arms will move in unison and in opposed relation when the power cylinder 60 is actuated.

An angle iron member 79 is fixed to the arm 58 adjacent to, but spaced from the lower end thereof and a similar member 80 is fixed adjacent the lower end of the arm 73. The angle members 79 and 80 form inwardly extending lumber receiving ledges extending forwardly and rearwardly of the device. A flat plate 79a is fixed to the arm 58 below the angle member 70 and a flat plate 80a is fixed to the arm 73 below the plate 80. The plates 79a and 80a are adapted to strike the ends of the boards previously stacked each time the arms 58 and 73 are returned to their closed position to square the ends of the boards with the stack.

Two stub members 81 and 82 are fixed to the front elevator frame member 28 at spaced points therealong and extend downwardly therefrom. Two parallel swinging links 83 and 84 are pivotally attached to the lower ends of the stub members 81 and 82 in the manner shown at 85 and 86, respectively. A horizontal board stop member 87 is pivotally connected to the lower ends of the swinging links 83 and 84 by pivot pins 88 and 89, respectively. A spring 90 connected at one of its ends to the elevator frame and at its other end to one end of the stop member 87, normally urges the stop member toward the right side of the machine to swing the stop member downwardly to its board feed stopping position (illustrated in Fig. 4) whenever the arms 58 and 73 are in their open position. When the arms 58 and 73 are in their closed position the member 79 on the arm 58 contacts the end of the stop member 87 and moves the stop member toward the left side of the machine and the swinging links 83 and 84 raise the stop member to its board clearing position (illustrated in Fig. 3).

The mechanism for raising the elevator 12 each time a new tier of boards is deposited on the stack comprises a pair of arms 91 and 92 fixed to the shaft 70 and extending inwardly therefrom. A pair of connected links 93 and 94 are pivotally connected at their upper ends to the inner ends of the arms 91 and 92 respectively. The upper ends of the links 93 and 94 are connected together by a cross member 95. The lower end of link 93 is pivotally connected to one end of a horizontal member 96 adjacent the front of the elevator frame. The pivotal connection between the link 93 and the horizontal member 96 is adjustable by inserting the pivot pin in any one of the holes 97 spaced longitudinally along the member 96 to permit adjustment for various positions of the movable carriage supporting the shaft 70. The link 94 is similarly pivotally connected to one end of a horizontal member 98 adjacent the rear of the elevator 12.

A pair of arms 99 and 100 are fixed to the shaft 55 and extend inwardly therefrom. A second pair of swinging links 101 and 102 are pivotally connected to the inner ends of the arms 99 and 100, respectively. The links 101 and 102 are connected at their upper ends by a cross member 103. The lower ends of the links 101 and 102 are pivotally connected to the opposite ends of the horizontal members 96 and 98, respectively. A vertical member 104 is fixed to the horizontal member 96 and extends downwardly therefrom adjacent the mid-portion thereof. Similarly, a vertical member 105 is fixed to and extends downwardly from the mid-portion of the horizontal member 98. A horizontal presser foot 106 extends forwardly and rearwardly of the machine and is fixed to the lower ends of the members 104 and 105. From this linkage it can be seen that when the shafts 55 and 70 are rotated in opposite directions by the opening and closing of the arms 58 and 73, the presser foot 106 will be moved vertically downwardly and upwardly.

Three plates 107, 108, and 109 are mounted on edge at spaced points along the forward lower elevator frame member 31 and extend forwardly therefrom. The forward ends of these plates are rounded in the manner shown at 110 in Fig. 5. The upper edges of the plates 107, 108, and 109 are at substantially the same level as the ledge members 79 and 80 when the arms 58 and 73 are in their closed position.

Four downwardly and inwardly inclined cam members 111 are fixed two to each of the lower elevator frame members 31 and 31a, one adjacent each end of each of said frame members. As the tiers are delivered onto the stack and the elevator 12 moved upwardly, the cam members 111 square the lateral edges of the stack.

A pair of arms 131 and 132 are pivotally attached to the upper front elevator frame member 28 at longitudinally spaced points therealong. The arms 131 and 132 extend parallel forwardly from the elevator frame over the conveyor 13 and rotatably support between their outer ends a shaft 133. Two wheels 134 and 135 are fixed to the shaft 133, one adjacent each of the arms 131 and 132. The wheels 134 and 135 rest on the upper surfaces of the boards B being conveyed to the device and are adapted to line up the boards as they approach the stacking device.

*Conveyor*

The conveyor 13 is pivotally attached at one of its ends to the table of a trimming saw 14 in the manner shown at 112 in Fig. 1. The opposite end of the conveyor is provided with two arms one of which is shown at 113 in Fig. 5. A roller 114 is rotatably mounted on each of the arms and the rollers are supported on inwardly facing flanges of two angle members 115 and 116 fixed to and extending forwardly from the elevator mechanism 12 adjacent the plates 107, 108, and 109 previously described.

*Pneumatic system*

As previously described, all of the operating members of the lumber stacker are linked to and operated by the double acting pneumatic cylinder 60 connected between the elevator frame member 61 and the upper end of the arm 58. The cylinder 60 is controlled by a four-way master valve 117 mounted in any convenient place on the elevator mechanism. A first pilot valve 118 is located at the rear of the elevator mechanism on the frame member 31a as shown in Fig. 5. The valve 118 is adapted to be actuated by the rearmost board upon completion of a tier of boards on the ledges 79 and 80 to actuate the master valve 117 to admit air under pressure to the cylinder 60 to cause the arms 58 and 73 to swing open and drop the tier onto the stack. A second pilot valve 119 is located on the elevator frame mechanism on the left side thereof as seen in Fig. 4, and is adapted to be contacted by the lower end of the arm 58 when it reaches its limit of outward travel. Actuation of the valve 119 reverses the master valve 117 causing the cylinder 60 to return the arms 58 and 73 to their initial position. A third pilot valve 120 is a manually operated two-way valve located at any convenient position on the main frame 10 to permit manual actuation of the device.

Referring now to the schematic view shown in Fig. 6, air under pressure from a suitable source (not shown) is supplied to the master valve 117 through a supply conduit 121. Branch conduits 122, 123, and 124 are connected between the main supply conduit and the pilot valves 118, 119, and 120 respectively. A conduit 125 connects pilot valve 118 to one side of the master valve 117, and a conduit 126 connects the pivot valve 119 to the other side. Two conduits 127 and 128 connect the master valve 117 with the opposite ends of the cylinder 60. A conduit 129 connects one outlet of the manual valve 120 with the conduit 125, and a conduit 130 connects the other outlet with the conduit 126.

*Operation*

In the operation of the device the boards B leaving the end trimming saw 14 are conveyed by the conveyor 13 to the stacking mechanism. The boards rest on the conveyor with their longitudinal axes transverse to the direction of movement and pass beneath the wheels 134 and 135 which help to align the boards on the conveyor.

At the start of a stacking operation, the dollies are placed on the tracks 23 and 24 beneath the frame 10 and the elevator is at its lowermost position relative to the frame 10. In this position the ledges 79 and 80 are above the dollies a distance approximately equal to two or three board thicknesses. The boards feed in over the plates 107, 108, and 109 and onto the ledges 79 and 80 each one being pushed rearwardly by the boards coming behind. The ledges support the boards by their ends. When the ledges 79 and 80 are full, thus completing a tier, the edge of the first board strikes the valve 118 and actuates the cylinder 60 to open the arms 58 and 73.

When the arms 58 and 73 open, the boards supported on the ledges 79 and 80 are dropped onto the dollies therebelow. At the time the arms open, the bar 87 is no longer held upward by the ledge member 79 and is pulled by the spring 90 to the right and downwardly to clamp against the upper surface of the board B then resting on the plates 107, 108, and 109, to stop further feeding until the arms 58 and 73 return to their closed position. The clamping bar 87 not only acts as a member to stop the feed but also holds the board thereunder from tilting if through misalignment one of the ends should not be supported on either plate 107 or 109.

Also, at the same time as the arms 58 and 73 move outwardly, the presser foot 106 is moved downwardly against the upper surface of the tier now resting on the dollies. The vertical travel of the presser foot 106 is sufficient to force the elevator mechanism, on which it is supported, upwardly a distance equal to the thickness of one board. As the elevator frame 12 moves upwardly, the cams 111 straighten the boards previously stacked on the dollies 26.

When the outward limit of travel of the arms 58 and 73 is reached, the lower end of the arm 58 strikes the valve 119 to reverse the action of the cylinder 60 to return the various movable elements to their normal position. When the arms 58 and 73 return to their closed position the plates 79a and 80a on the lower ends thereof strike the ends of the boards to square the ends of the stack. Since the return of the arm 58 to its closed position raises the feed stop bar 87, the feeding automatically resumes and the cycle is repeated. The device continues to automatically repeat this cycle of operations until the stack has reached the desired height at which time the manual valve 120 is actuated to open the arms and leave them in their open position to permit removal of the stack and insertion of new dollies under the device to begin a new stack.

While I have shown and described a preferred form of my invention, it is to be understood that various changes may be made therein by those skilled in the art without departing from the spirit of the invention as defined in the appended claims.

Having thus described my invention, what I claim and desire to secure by Letters Patent is as follows:

1. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of the side edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges; said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; power means for moving the lower ends of said arms outwardly upon completion of a tier to permit the tier of boards to drop onto the lumber transport therebelow; and means on said elevator adjacent the rear thereof adapted to be contacted by said lumber when a tier is completed on said ledges to actuate said power means.

2. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of the side edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges; said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; power means for moving the lower ends of said arms outwardly upon completion of a tier to permit the tier of boards to drop onto the lumber transport therebelow; means on said elevator adjacent the rear thereof adapted to be contacted by said lumber when a tier is completed on said ledges to actuate said power means; and downwardly and inwardly inclined cam surfaces, one adjacent each of the corners of said elevator mechanism below said ledges and adapted to square the tier of boards as it drops from said ledges.

3. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of the side edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges; said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; power means for moving the lower ends of said arms outwardly upon completion of a tier to permit the tier of boards to drop onto the lumber transport therebelow; means on said elevator adjacent the rear thereof adapted to be contacted by said lumber when a tier is completed on said ledges to actuate said power means; downwardly and inwardly inclined cam surfaces, one adjacent each of the corners of said elevator mechanism below said ledges and adapted to square the tier of boards as it drops from said ledges; and means for stopping the feed of said boards during the time when said arms are in their open position.

4. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of said edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges; said presser foot being supported by linkage connected to said arms and movably thereby downwardly to press against the upper surface of the uppermost tier of boards in said stack when said arms are moved outwardly to drop a tier of boards and to force said elevator mechanism upwardly a distance equal to the thickness of said boards; pneumatic power means connected to said elevator and said arms for moving the lower ends of said arms outwardly to permit the tier of boards to drop onto the lumber transport therebelow; and valve means on said elevator adjacent the rear thereof adapted to be contacted by said lumber when a tier is completed on said ledges to actuate said pneumatic power means.

5. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of said edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges, said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; pneumatic power means connected to said elevator and said arms for moving the lower ends of said arms outwardly to permit the tier of boards to drop onto the lumber transport therebelow; valve means on said elevator adjacent the rear thereof adapted to be contacted by said lumber when a tier is completed on said ledges to actuate said pneumatic power means; a second valve means mounted on said elevator and adapted to be connected by the lower end of one of said arms when said one arm reaches its outermost position, said second valve means being adapted to reverse the action of said pneumatic cylinder to cause said arms to move toward each other.

6. In a device for stacking lumber: a rectangular main frame adapted to straddle a lumber transport device; a rectangular elevator mechanism adapted to be raised and lowered within said main frame; a pair of lumber receiving arms movably connected to said elevator mechanism, one adjacent each of said edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges, said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; pneumatic power means connected to said elevator and said arms for moving the lower ends of said arms outwardly to permit the tier of boards to drop onto the lumber transport therebelow; valve means on said elevator adjacent the rear thereof adapted to be contacted by said lumber when a tier is completed on said ledges to actuate said pneumatic power means; a second valve means mounted on said elevator and adapted to be contacted by the lower end of one of said arms when said one arm reaches its outermost position, said second valve means being adapted to reverse the action of said cylinder to cause said arms to move toward each other; and downwardly and inwardly inclined cam surfaces one adjacent each of the corners of said elevator mechanism below said ledges adapted to square the tier of boards as it drops from said ledges.

7. In a device for stacking lumber: a rectangular main frame adapted to straddle a lumber transport device; a rectangular elevator mechanism adapted to be raised and lowered within said main frame; means for counterbalancing the weight of said elevator mechanism; a pair of lumber receiving arms movably connected to said elevator mechanism, one adjacent each of said edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges, a presser foot centrally located between said arms above said ledges, said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; power means connected to said elevator and said arms for moving the lower ends of said arms outwardly to permit the tier of boards to drop onto the lumber transport therebelow; means on said elevator adjacent the rear thereof adapted to be contacted by said lumber when a tier is completed on said ledges to actuate said power means.

8. In a device for stacking lumber: a rectangular main frame adapted to straddle a lumber transport device; a rectangular elevator mechanism adapted to be raised and lowered within said main frame; means for counterbalancing the weight of said elevator mechanism; a pair of lumber receiving arms movably connected to said elevator mechanism, one adjacent each of said edges thereof so that their lower ends may move toward and away from each other; an inwardly extending ledge adjacent the bottom end of each of the arms; an endless conveyor for feeding boards of lumber arranged transversely thereon to said ledges to build up a tier of said boards in side by side relation, the delivery end of said conveyor being articulated to the front portion of said elevator at a level substantially even with said ledges; a presser foot centrally located between said arms above said ledges, said presser foot being supported by linkage connected to said arms and movable thereby downwardly to press against the upper surface of the uppermost tier of boards in said stack when said arms are moved outwardly to drop a tier of boards and to force said elevator mechanism upwardly a distance equal to the thickness of said boards; pneumatic power means connected to said elevator and said arms for moving the lower ends of said arms outwardly to permit the tier of boards to drop onto the lumber transport therebelow; valve means on said elevator adjacent the rear thereof adapted to be contacted by said lumber when a tier is completed on said ledges to actuate said pneumatic power means; and a second valve means mounted on said elevator and adapted to be contacted by the lower end of one of said arms when said one arm reaches its outermost position, said second valve means being adapted to reverse the action of said pneumatic power means to cause said arms to move toward each other.

References Cited in the file of this patent

UNITED STATES PATENTS

| | | |
|---|---|---|
| 1,141,277 | Smith | June 1, 1915 |
| 1,202,838 | Heffernan | Oct. 13, 1916 |
| 1,208,802 | Lienau | Dec. 19, 1916 |
| 1,225,523 | Surles | May 8, 1917 |
| 1,767,442 | Evans | June 24, 1930 |
| 1,958,133 | Delany | May 8, 1934 |
| 2,005,906 | Pierce | June 25, 1935 |
| 2,315,003 | Martin et al. | Mar. 30, 1943 |
| 2,607,501 | Jeffrey | Aug. 19, 1952 |

FOREIGN PATENTS

| | | |
|---|---|---|
| 141,624 | Sweden | Aug. 4, 1953 |